H. K. HITCHCOCK.
GLASS MATERIAL HANDLING APPARATUS.
APPLICATION FILED JULY 28, 1913.
1,151,590.
Patented Aug. 31, 1915.
4 SHEETS—SHEET 1.
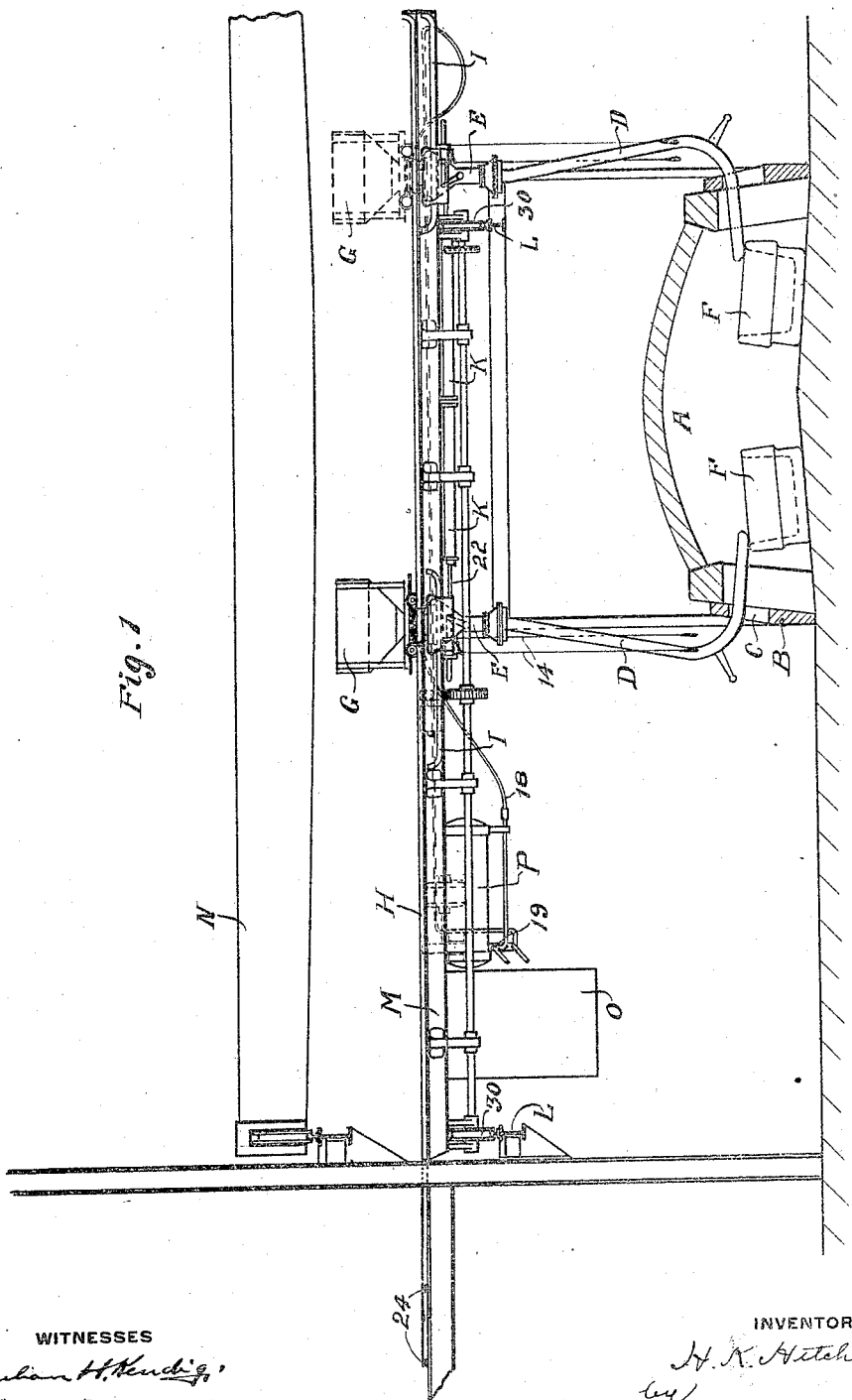

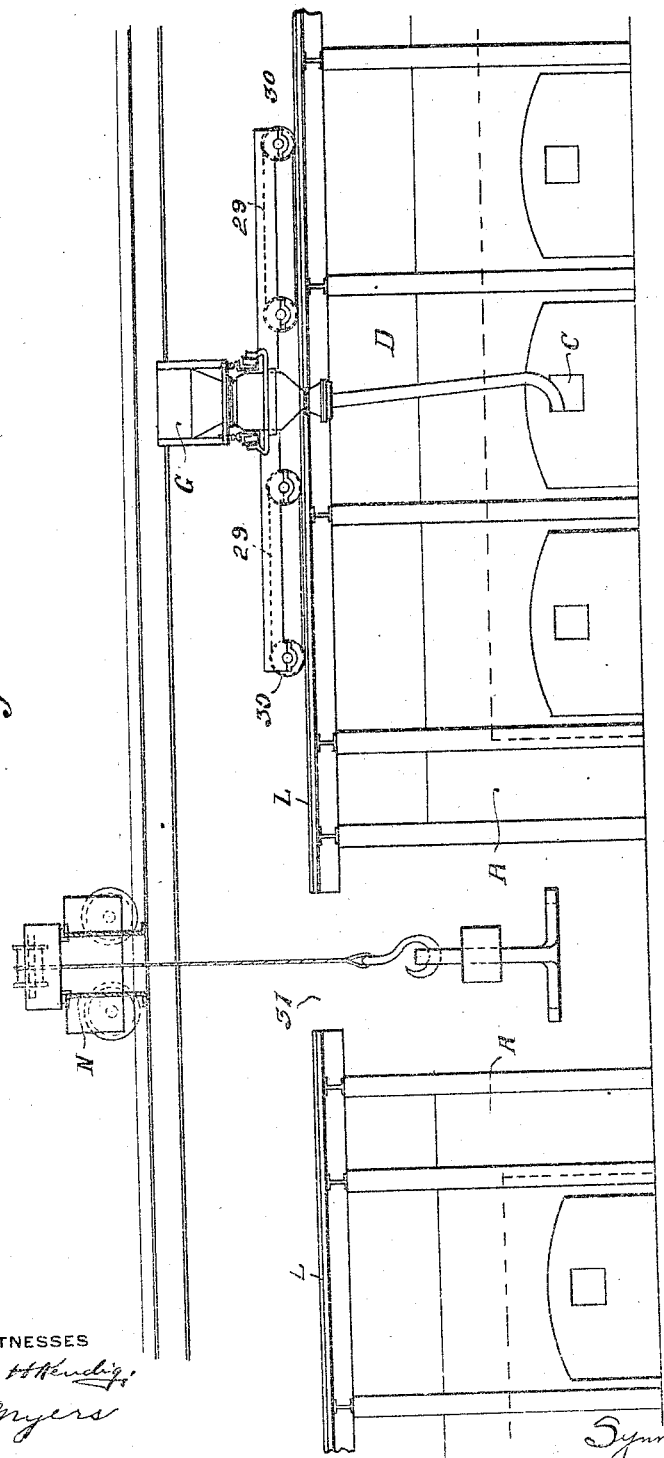

H. K. HITCHCOCK.
GLASS MATERIAL HANDLING APPARATUS.
APPLICATION FILED JULY 28, 1913.
1,151,590.
Patented Aug. 31, 1915.
4 SHEETS—SHEET 3.
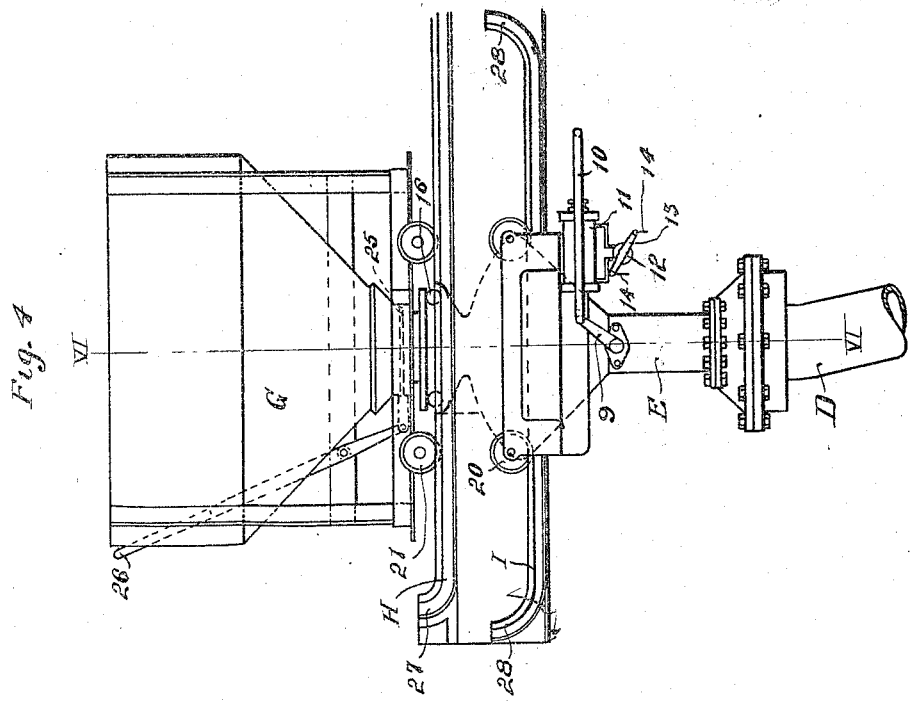
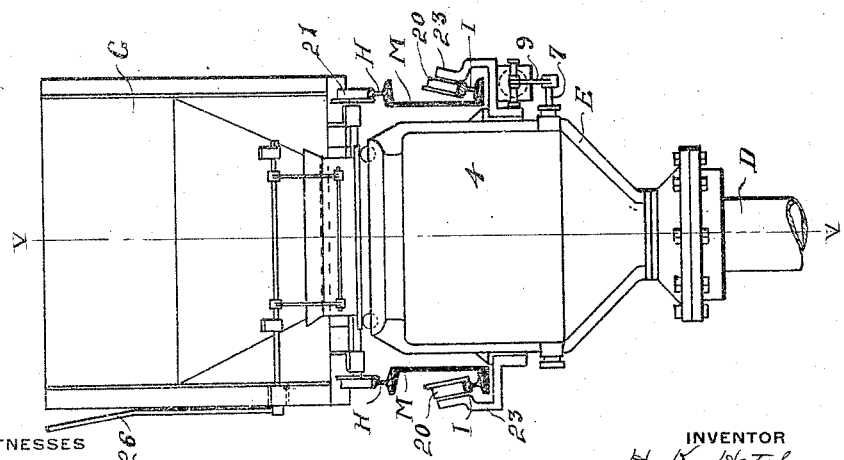
WITNESSES
INVENTOR
H. K. Hitchcock
by
Synnestvedt & Bradley
Att'y.

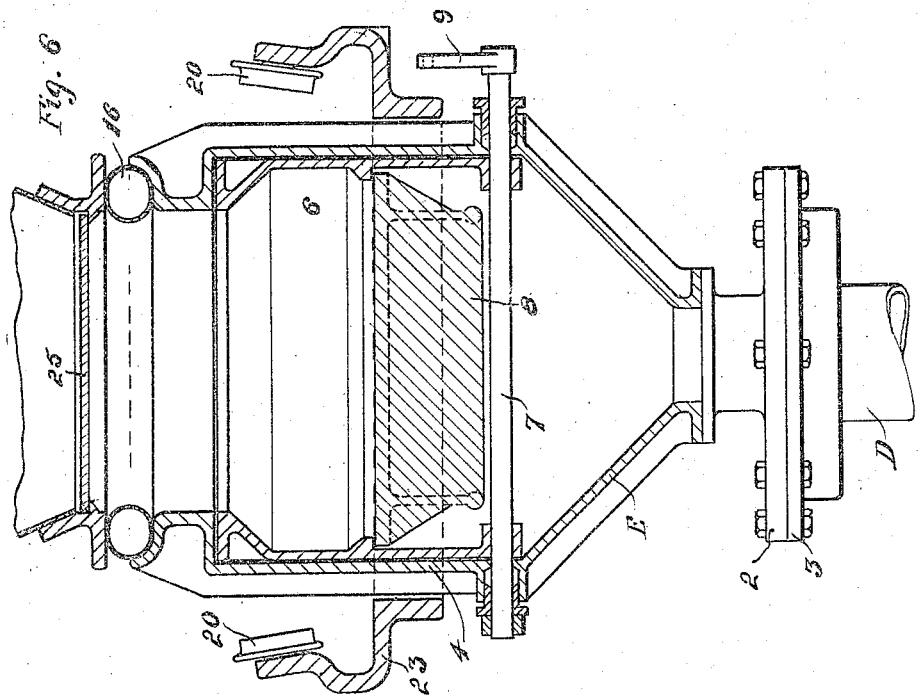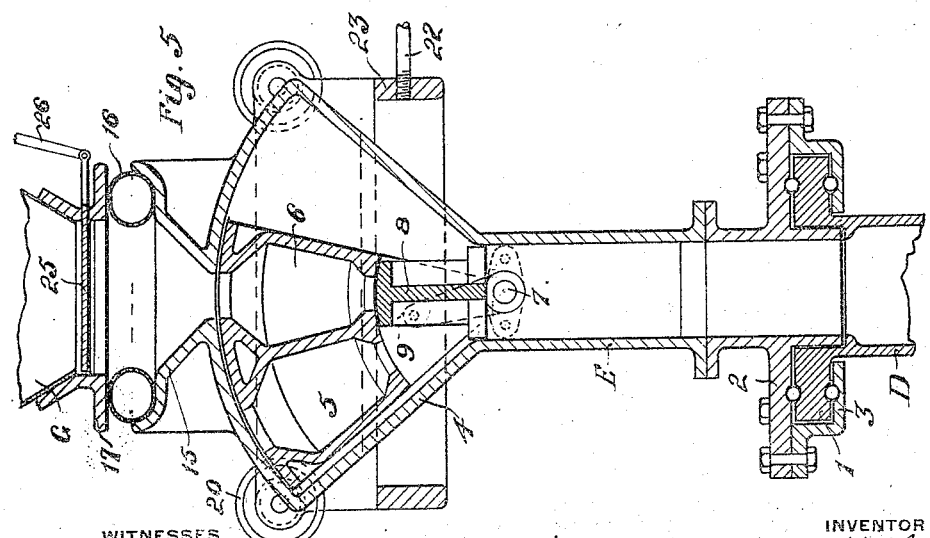

UNITED STATES PATENT OFFICE.

HALBERT K. HITCHCOCK, OF TARENTUM, PENNSYLVANIA, ASSIGNOR TO PITTSBURGH PLATE GLASS COMPANY, OF PITTSBURGH, PENNSYLVANIA, A CORPORATION OF PENNSYLVANIA.

GLASS-MATERIAL-HANDLING APPARATUS.

1,151,590.  Specification of Letters Patent.  Patented Aug. 31, 1915.

Application filed July 28, 1913. Serial No. 781,530.

*To all whom it may concern:*

Be it known that I, HALBERT K. HITCHCOCK, a citizen of the United States, residing at Tarentum, in the county of Allegheny and State of Pennsylvania, have invented certain new and useful Improvements in Glass-Material-Handling Apparatus, of which the following is a specification.

The invention relates to apparatus for handling the batch employed in the pots of a glass furnace in the manufacture of glass. The invention has for its primary objects; the provision of an apparatus constituting an improvement over that of my prior Patent No. 990,555, issued April 25, 1911; the provision of an improved apparatus of the type shown in the said patent, wherein means are provided for securing the application of the batch to the pots in relatively small measured quantities or units; and the provision of improved means whereby a seal and connection is secured between the supply receptacle employed and the charging tube. One embodiment of the invention is illustrated in the accompanying drawings, wherein—

Figure 1 is a transverse section through a pot furnace, with the handling apparatus in side elevation, Fig. 2 is a front elevation of the apparatus of Fig. 1, Figs. 3 and 4 are front and side elevation views respectively of the upper portion of the charging apparatus, and Figs. 5 and 6 are sections on the lines V—V and VI—VI of Figs. 3 and 4 respectively.

In the apparatus of my prior patent above referred to the batch is supplied to the pots by means of an upright tube leading from an elevated batch receptacle, and broadly considered, this is the apparatus which is employed in my present construction, but in the apparatus of my prior patent no means were provided for gaging or measuring the batch as it flowed through the charging tube, and after the controlling valve of the receptacle was opened the entire charge from the receptacle flowed into the pot. One of the primary features of distinction of my present structure over that of my prior patent consists in the provision of an increment feeder whereby the batch is supplied in small units from the receptacle to the pot, the units of quantity being such that about ten are required in order to fill the pot. This departure is of advantage, as different pots in the furnace require different quantities of batch, depending upon their location, and the increment feeder provides a means whereby each pot may be supplied with exactly the required number of units of batch. The supplying of batch in relatively small units at separated intervals is also of advantage in that the melting operation is more quickly executed than where the pot is entirely filled with batch at one time. This is due to the fact that each unit of the batch as it is supplied to the pot is exposed to the reflected heat from the crown of the furnace, so that by the time the next unit is supplied the first unit is heated through. As a result the entire mass of batch in the pot is thoroughly heated through by the time the pot is filled. Other improvements involved in this present apparatus over that of my prior patent consist in the means whereby the receptacle and tube are made to move together as the tube is moved in and out before and after the filling operation, and in the provision of improved means for securing a seal between the receptacle outlet and the tube during the charging operation, so that there is no escape of dust at this point.

Referring first to the general arrangement of parts as shown in Figs. 1 and 2, A A are the pot furnaces, which as illustrated are of the usual type provided with the removable tuilles B having the charging openings C; D D are the lower sections of the charging tubes; E E are the upper sections of the charging tubes, the upper ends of which are enlarged and carry the increment feeders heretofore referred to; F F are the pots located in the furnace to which the tubes D D discharge; G is a charging hopper located on a transversely extending track H and adapted to discharge by gravity into the upper ends of the charging tubes: I I are the transverse tracks immediately below the track H upon which the upper ends of the tubes are suspended for lateral movement in moving the lower ends of the charging tubes in and out of the furnace; K K are the power cylinders by means of which the tubes are moved laterally upon the tracks I I;

L L are the parts of the track upon which the framework or trolley M carrying the rails H and hopper G are mounted, such rails L L extending longitudinally of the furnace house and over a plurality of furnaces, and N is the usual pot handling crane also mounted for movement longitudinally of the furnace house, above the trolley M carrying the rails H and the hopper G.

The lower portion D of the charging tube is supported for rotary movement about its axis, from the upper section E of the tube, as indicated in Fig. 5, the flange 1 of the tube D lying between the parts 2 and 3, and freely rotatable by reason of the antifriction balls.

The upper portion of the tube section E is provided with an expanded portion 4 in which oscillates a casting having the pockets or chambers 5 and 6, the said casting being mounted for oscillation upon the transversely extending rod 7 as indicated in Fig. 6. A transversely extending fixed member 8 serves to close the bottom of the pocket 6 when such pocket is in the position illustrated in Fig. 5. When the parts are in the position indicated in Fig. 5, the pocket 5 discharges downwardly through the opening in its lower end, while the pocket 6 is filled with batch from the hopper G. In order to discharge the pocket 6 the casting containing the two pockets is swung to the right, which movement carries the opening at the bottom of the pocket 6 off of the top of the member 8 and permits such pocket to discharge downwardly, this movement bringing the pocket 5 over the member 8 and in position to be filled from the hopper G. It will be seen that for each oscillation of the casting carrying the two pockets a discharge of batch is secured to the charging tube. The rod or shaft 7 carrying the pockets is oscillated by means of a crank 9 connected at its outer end to the yoke 10 (Fig. 4). The yoke is reciprocated by means of the piston of the pneumatic cylinder 11, and the actuation of the piston is governed by means of the valve 12 whose handle 13 is operated from the cords 14 extending downwardly to a position adjacent the front of the furnace, or extending to any other desired point of actuation, such for instance as the cage O (Fig. 1) which carries the operator of the other apparatus.

In order to make a tight joint between the expanded portion 15 above the pockets 5 and 6 (Figs. 5 and 6), and the lower end of the hopper G, the pneumatic tube 16 is preferably employed. This tube lies in the expanded portion 15 and when inflated bears against the underside of the flange 17 carried by the hopper G. This pneumatic tube 16 may be inflated by means of a supply of air from the cylinder P (Fig. 1). A flexible pipe 18 leads from the air cylinder P to the pneumatic tube 16, and the inflation and deflation of the tube is controlled by the operator in the cage O, by means of the three-way valve 19 which is accessible from the cage.

The pneumatic tube 16 not only constitutes a seal for preventing the escape of dust during the charging operation, but also serves as a positive connection between the tube and the hopper, so that when the pneumatic tube is inflated and the tube is moved the hopper moves with it. By reference to Figs. 4 and 6 it will be seen that the trolley 23 carrying the upper end of the tube is provided with the wheels 20 working upon the tracks I, and that the hopper G is provided with wheels 21 working upon the track H spaced above the track I and parallel thereto. The movement of the tube supported by its wheels 20 along the track I is accomplished by means of the power cylinder K (Fig. 1) whose piston rod 22 is secured to the trolley 23 carrying the wheels 20. It will be understood that after a pot has been filled the cylinder K is supplied with fluid to cause the movement of the tube with fluid to cause the movement of the tube away from the furnace, thus withdrawing its lower end to position outside the charging opening C (Fig. 1). The trolley or framework M mounted upon the tracks L L is then moved longitudinally of the furnace to bring the charging tube opposite the next charging opening C, after which fluid is again supplied to the cylinder K to cause the movement of the charging tube toward the furnace so that its lower end is moved through an opening C and in position to charge another pot. During these movements of the charging tube the pneumatic tube 16 forming the seal and connection between the tube and the hopper is kept inflated, so that the hopper is moved with the charging tube. The tube and hopper are therefore maintained in their proper relative positions until the entire contents of the hopper are discharged, and repeated positionings of the hopper over the tube, such as would be necessary if the hopper and tube were not connected by the pneumatic seal 16, are avoided. After the contents of the hopper G has been discharged the pneumatic tube 16 is deflated and the hopper is moved laterally off of its trolley M and switched onto the track 24 (Fig. 1) extending longitudinally of the furnace house (technically called a hall). Another hopper full of batch is brought to position along the track 24 and transferred to the track H. The movement of the hopper along the track 24 and along the track H to its charging position may be secured by any desired means, but is preferably accomplished by means of an electric car (not shown). While the hopper G is being moved to its charging position as shown in Fig. 5 the escape of the contents is prevented by means of a sliding door 25 operable by means of a handle 26.

The preferred arrangement of the trolley frame which carries the two sets of tracks I and H will be readily understood by reference to Fig. 3 from which it will be seen that the frame members A are channels carrying upon their upper flanges the rails H, and upon their lower flanges the rails I. The outer ends of the rails H, and both ends of the rails I are turned up as indicated at 27 and 28 (Fig. 4), in order to prevent the wheels from running off the tracks in case the trucks should be accidentally moved laterally too far.

The framework or trolley frame M is supported at its ends on transverse beams 29 as indicated in Fig. 2, such beams being provided with the wheels 30 engaging the rails L. The rails L are interrupted at the end of the furnaces in order to permit of the passage of the pot handling crane N, as indicated in Fig. 2, and the relatively long beam 29 with its plurality of wheels is necessary in order that the cut-out portions 31 may be properly bridged. It will be seen that in order to properly accomplish this bridging action, at least three wheels 30 are necessary, and these wheels must be spaced apart distances such that two wheels will always be upon the track L. With the rails L arranged as indicated in Fig. 1 it is not of course necessary that the left hand rail L should have cut-out places, since the left hand end of the beam N does not extend to the left past the rail L, so that there is no occasion for the pot carrying crane to pass such left hand rail.

The operation of the apparatus briefly stated is as follows. The batch car G is brought along the track 24 (Fig. 1) to a position opposite the rails H, the hopper preferably being moved to position by means of an electric car. The hopper is then switched to the rails H and moved to the position indicated in Fig. 1, by the electric car, which car then returns to the rails 24. The car G is of course positioned over the top of the charging tube, and after being positioned air is supplied to the pneumatic sealing tube 16, to seal off the space between the hopper and the tube, and lock such parts together. The cylinder K is then operated to move the tube and the hopper to the right, to the position indicated in Fig. 1, at which time the lower end of the tube is opposite the top of the pot. The sliding door 25 in the bottom of the hopper is then operated to permit the batch to flow downward into one of the pockets in the increment feeder (Fig. 5). On swinging the increment feeder to the right from the position indicated in Fig. 1 the contents of the pocket 6 is discharged to the tube and thence to the pot, while the other pocket 5 is brought into position to be filled from the hopper. The pockets are then swung in the reverse direction to permit the pocket 5 to discharge and the pocket 6 to fill. This operation is repeated until the required number of charges from the pockets have been discharged to the pots, the number of charges as at present contemplated in order to fill the pots the first time, being about ten. The pots are preferably arranged with respect to the charging opening C (Fig. 1) so that by shifting the tube about its axis two pots may be filled through the one opening. After the two pots are filled the cylinder K is actuated to move the tube out of the furnace, after which the trolley frame M carrying the entire apparatus is moved longitudinally of the furnace to bring the charging tube opposite the next opening. The apparatus employed at the other side of the furnace (Fig. 1) and its operation are of course substantially the same as that just described.

What I claim is:

1. Apparatus for supplying material through the charging opening of a furnace, comprising a track above the furnace extending transversely thereof, a charging tube supported for movement along the track with its lower end positioned so that such lower end is moved through the charging opening and out again as the tube is moved back and forth along the track, means for moving the tube on the track, another track above the first track, a gravity discharge hopper on such other track with its outlet in position to discharge to the upper end of the tube, and a pneumatic tube surrounding the outlet from the hopper and lying between such hopper and the charging tube, such pneumatic tube when inflated forming a seal and frictional connection between the charging tube and the hopper.

2. Apparatus for supplying material through the charging opening of a furnace, comprising a track above the furnace extending transversely thereof, a charging tube supported for movement along the track with its lower end positioned so that such lower end is moved through the charging opening and out again as the tube is moved back and forth along the track, means for moving the tube on the track, a manually controlled increment feeding device in the upper end of the tube, another track above the first track, and extending transversely of the furnace a gravity discharge hopper mounted for movement on such other track with its outlet in position to discharge to the said increment feeder, and a pneumatic tube for forming a seal between the tube and hopper.

3. Apparatus for supplying material through the charging opening of a furnace, comprising a track above the furnace extending transversely thereof, a charging tube supported for movement along the track, a gravity discharge hopper mounted above the end of the tube, and a pneumatic tube surrounding the outlet from the hopper and forming when inflated a seal between the tube and the hopper.

4. Apparatus for supplying material through the charging opening of a furnace, comprising a gravity discharge hopper above the furnace having a door at its lower end, a manually controlled increment feeding device in position to receive the discharge from the hopper mounted for movement with respect to the furnace and hopper, a releasable substantially air tight sealing means between the hopper and increment feeding device, and a charging tube leading downward from the said feeding device.

5. Apparatus for supplying material through the charging opening of a furnace, comprising a track above the furnace extending transversely thereof, a charging tube supported for movement along the track with its lower end positioned so that such lower end is moved through the charging opening and out again as the tube is moved back and forth along the track, means for moving the tube on the track, another track above the first track and parallel thereto, a gravity discharge hopper mounted for movement on such other track with its outlet in position to discharge to the upper end of the tube, a door at the lower end of said hopper, and a releasable substantially air tight connecting seal between the tube and the hopper.

6. Apparatus for supplying material through the charging opening of a furnace, comprising a track above the furnace extending transversely thereof, a charging tube supported for movement along the track with its lower end positioned so that such lower end is moved through the charging opening and out again as the tube is moved back and forth along the track, means for moving the tube on the track, another track above the first track and parallel thereto, a gravity discharge hopper mounted for movement on such other track with its outlet in position to discharge to the upper end of the tube, a door at the lower end of the hopper and a releasable substantially air tight means for connecting the hopper and tube so that when the tube is moved along its track the hopper moves along with it.

In testimony whereof I have hereunto signed my name in the presence of the two subscribed witnesses.

HALBERT K. HITCHCOCK.

Witnesses:
 ARCHWORTH MARTIN,
 LETITIA A. MYERS.

Copies of this patent may be obtained for five cents each, by addressing the "Commissioner of Patents, Washington, D. C."